Oct. 25, 1927.
C. N. SWAN
1,646,635
AUTO WHEEL
Filed July 28, 1924
2 Sheets-Sheet 2
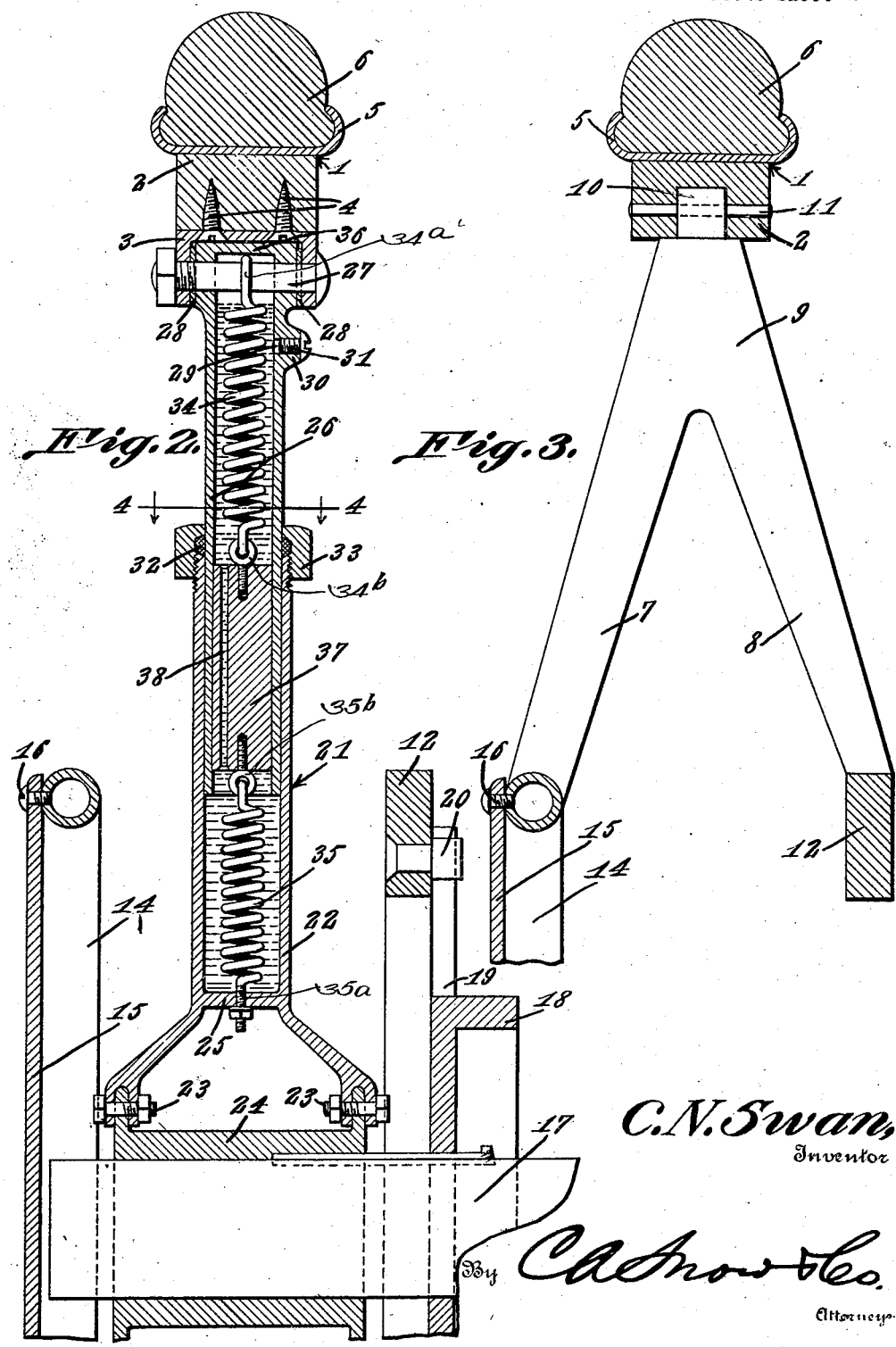
C. N. Swan,
Inventor Patented Oct. 25, 1927.

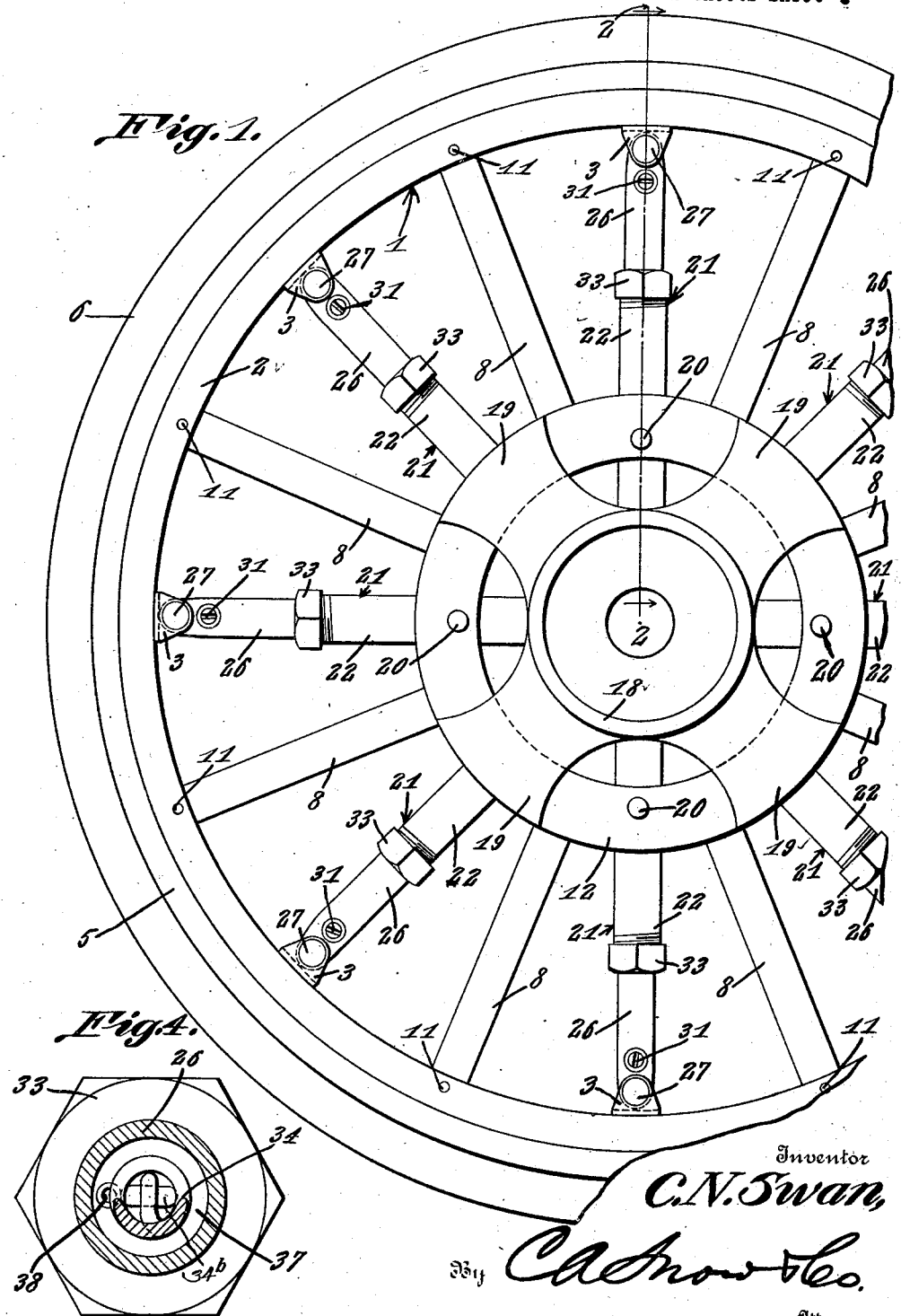

1,646,635

UNITED STATES PATENT OFFICE.

CHARLES NEWTON SWAN, OF LOUISVILLE, KENTUCKY.

AUTO WHEEL.

Application filed July 28, 1924. Serial No. 728,697.

The device forming the subject matter of this application is a vehicle wheel and the invention aims to provide novel means whereby pneumatic tires, subject to puncture and deterioration, may be dispensed with.

It is within the province of the disclosure to improve generally and to enhance the utility of devices of that sort to which the invention appertains.

Although a preferred form of the invention has been shown in the drawings, a wheel-wright, working within the scope of what is claimed, may make changes without departing from the spirit of the invention.

In the drawings:—Figure 1 shows in elevation, a portion of a wheel wherein the invention has been embodied; Figure 2 is a section on the line 2—2 of Figure 1; Figure 3 is a radial section wherein the frame of the wheel appears mostly in elevation; Figure 4 is a section on the line 4—4 of Figure 2.

The wheel body 1 may be constructed as desired. As shown, it embodies a felly 2, brackets 3 secured at 4 to the felly, a rim 5 on the felly and a tire 6 carried by the rim. The tire 6 may be made of solid rubber and is used merely to avoid noise.

The frame of the wheel includes diverging spokes 7 and 8 each pair thereof being connected by a head 9 having a tenon 10 secured at 11 to the felly 2. The spokes 8 are joined integrally to a ring 12, and the spokes 7 are joined integrally to a ring 14, whereon a cover plate 15 is attached as at 16. An axle 17 is shown and carries a brake drum 18 provided with arms 19. The axle 17 passes through the rings 12 and 14, the rings being large enough so that they can move parallel to the plane of the wheel, without striking the axle 17. The ring 12 has lateral projections 20, adapted to cooperate with the arms 19 of the brake drum in a way to be pointed out hereinafter.

Telescopic spokes 21 are provided. Each spoke 21 includes an inner tubular member 22 pivoted at 23 to a hub 24 which may be secured as shown to the axle 17. The member 22 of the spoke 21 has an inner end wall 25. Each spoke includes an outer tubular member 26 mounted to slide in the inner tubular member 22 and connected by a pivot element 27 with the bracket 3 of the wheel body 1, washers 28 being interposed between the sides of the spoke member 26 and the bracket to limit leakage along the pivot element 27, the spoke being adapted to contain oil or other liquid, because the spoke is hollow, and the oil may be introduced into the spoke through an opening 29 formed in a boss 30 on the spoke member 26, the opening 29 being closed by a screw 31 or the like. With a view to preventing leakage, a gasket 32 is held about the spoke member 26 by means of a collar 33 threaded on the spoke member 22. The outer end of a spring 34 is connected at 34ª to the pivot element 27, the spring being located in the member 26 of the spoke. The outer end of a spring 35 is connected at 35ª to the inner end wall 25 of the spoke member 22, it being observed that the outer member 26 of the spoke has an end wall 36, so that the oil or other liquid may be retained in the spoke. A piston 37 is mounted to slide in the spoke member 26 and is provided with any desired number of bypass ducts 38, but one duct being shown, although there may be as many ducts as desired. The inner end of the spring 35 is connected at 35ᵇ to the piston 37, and the corresponding end of the spring 34 is connected at 34ᵇ to the piston 37.

The hub 24 and the axle 17 are suspended by means of the springs 34 and 35 and the spokes can swing parallel to the plane of the wheel on the pivot elements 23. In the event that the spokes 21 swing to a considerable extent, due, for instance, to a pronounced torque produced by the axle 17, the projections 20 on the frame of the wheel will coact with the arms 19 of the brake drum 18 and afford a positive stop. The members 22 and 26 of the spoke 21 can telescope with respect to each other, the piston 37 sliding lengthwise of the spoke, and oil or other liquid in the spoke moving from one end of the spoke to the other, through the duct 38 in the piston. The result is that the wheel although resilient, will have considerable stability and the springs 35 and 34, further, will be lubricated at all times.

What is claimed is:—

A wheel including a body and a hub, spokes each comprising telescoped members adapted to contain a liquid, the telescoped members of each spoke being pivoted respectively to the body and to the hub, to swing parallel to the median plane of the wheel, a piston fitting closely but slidably in one of the telescoped members of each of said spokes, there being chambers at the ends of each spoke on opposite sides of the piston, and springs connected at their inner ends to the piston and at their outer ends to the members of the spokes, the piston being provided with a bypass duct which opens at its ends through the ends of the piston in spaced relation to the periphery of the piston, the duct communicating at its ends with the aforesaid chambers.

In testimony that I claim the foregoing as my own, I have hereto affixed my signature.

CHARLES NEWTON SWAN.